Figures 1, 2:
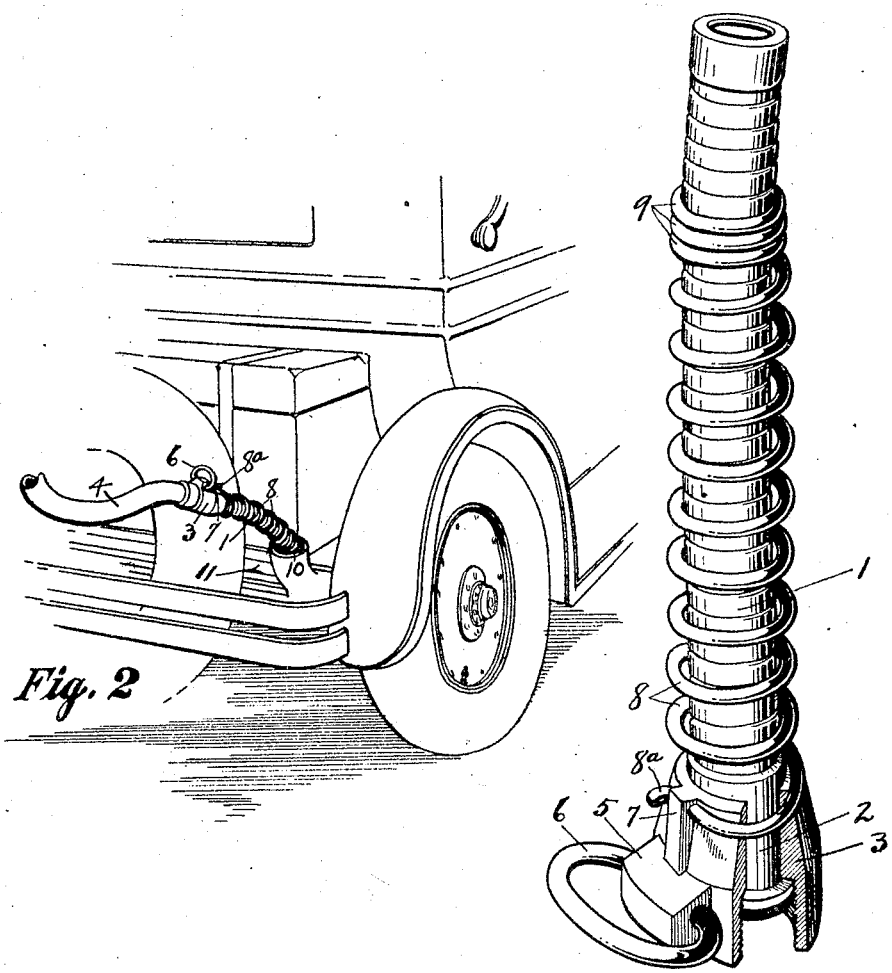

June 24, 1930. W. E. HARMAN 1,768,356

HOSE NOZZLE

Filed March 18, 1925

INVENTOR.
William E. Harman
BY
ATTORNEY.

UNITED STATES PATENT OFFICE

WILLIAM E. HARMAN, OF LOS ANGELES, CALIFORNIA, ASSIGNOR TO HARMAN PACIFIC COMPANY, OF LOS ANGELES, CALIFORNIA

HOSE NOZZLE

Application filed March 18, 1925. Serial No. 16,508.

My invention relates to hose nozzles used on the end of hose running from a supply of gasoline and the like and adapted to be inserted into an inlet opening to a tank or other receptacle. The principal object of my invention is to provide in combination with a flexible nozzle means for preventing said nozzle from accidentally slipping from said inlet opening and discharging gasoline over the tank or body of an automobile. I am aware that it is old to provide a flexible nozzle with a spiral wire permanently secured thereto for strengthening the nozzle and for holding it, but such spiral wire is soldered at its opposite ends to the nozzle and is easily broken away therefrom and must be resoldered or otherwise repaired, or a new nozzle supplied.

I have conceived the idea of forming a lug on a part of the nozzle through which one end of such spiral wire can be inserted and secured, as by bending it slightly, and of leaving the other end of said spiral wire free, with a turn or two of the wire to form a suitable free end on said spiral wire, whereby said spiral member can flex or yield longitudinally of the nozzle and thus be more efficient in performing the desired service. If the spiral member should ever need repair in any respect, it is easily removed and replaced, or, if a new nozzle is required to replace the old flexible nozzle, it is possible and practicable to remove the spiral member and use it on the new nozzle, thus reducing the expense of providing a practical flexible nozzle with the spiral wire guard.

In order to further explain my invention, I have shown one embodiment thereof on the accompanying sheet of drawings, in which,—

Figure 1 is a side elevation of a flexible nozzle with my invention applied thereto; and Figure 2 is a fragmentary view of the rear end of an automobile, showing the invention in actual use.

Referring now in detail to the drawings, 1, designates a flexible nozzle, having an attaching element, 2, with coupling element, 3, by means of which it can be readily connected to a supply hose, as 4, running from any suitable supply of gasoline, or other liquid. The coupling element, 3, is provided with a lug portion 5, with a supporting ring, 6, for supporting the nozzle and the hose when not in use.

Said coupling element, 3, is also provided with a lug, 7, with hole therein to receive the end of a spiral wire member, 8, the end being slightly bent, as at $8^a$, to prevent it from detachment from said lug. Said spiral member 8 is free at its opposite end and is given extra turns, as at 9, capable of sliding freely on the nozzle, whereby said spiral member can flex or yield for automatic adjustment in the inlet opening, as at 10, in a tank, 11, shown clearly in Fig. 2.

Thus by providing a simple means of attachment for the end of the wire element, whereby it can be readily detached and replaced, I make it possible to get longer use from the spiral member, as there is little or no wear on such members, and avoid the inconvenience and expense of having to repair or resolder the end of the wire which is thus attached to the nozzle member.

I do not limit the invention except as I may be limited by the hereto appended claims.

I claim:

1. A nozzle adapted to be attached to a supply hose and to be inserted through an inlet opening in a tank, a coupling member on said nozzle for connecting it to a supply hose, said coupling member having a hole therein, means for holding said nozzle in said opening, said means consisting of a spiral wire wound loosely upon said nozzle and having one end inserted into said hole in said coupling member and having its other end free to move longitudinally of said nozzle, for the purpose indicated.

2. A nozzle for supplying gasoline and the like to tanks and adapted to be inserted through a supply opening therein, said nozzle having a coupling member provided with a hole through its side, and a loose spiral spring on said nozzle having one end inserted through said hole and secured in place therein to prevent said spiral spring from becoming accidentally detached from said nozzle, said spiral spring moving freely at its opposite end lengthwise upon said nozzle.

3. A nozzle of the character referred to including in combination, a flexible nozzle section, a coupling member for attaching it to a supply hose, an integral lug on said coupling member, and a spiral spring member on said nozzle with its end through said lug.

4. A nozzle to be inserted through a tank opening and including in combination, a nozzle section, a coupling member for attaching it to a supply hose, said coupling member being provided with an integral thick portion with a hole therethrough, and a spiral spring member on said nozzle section to hold it from slipping out of said tank opening, one end of said spiral spring member being inserted through the hole in said coupling member and bent sufficiently to retain it in place.

Signed at Los Angeles, Los Angeles County, California, this 12th day of March, 1925.

WILLIAM E. HARMAN.